United States Patent
Sugiura

(10) Patent No.: US 6,941,479 B1
(45) Date of Patent: Sep. 6, 2005

(54) ELECTRONIC APPARATUS

(75) Inventor: Takashi Sugiura, Moriya-machi (JP)

(73) Assignee: Canon Kabushiki Kaisha, Tokyo (JP)

( * ) Notice: Subject to any disclaimer, the term of this patent is extended or adjusted under 35 U.S.C. 154(b) by 585 days.

(21) Appl. No.: 09/708,552

(22) Filed: Nov. 9, 2000

(30) Foreign Application Priority Data

Nov. 10, 1999 (JP) .............................. 11-319011
Oct. 19, 2000 (JP) ...................... 2000-318773

(51) Int. Cl.⁷ ............................ G06F 1/26; G06F 11/00
(52) U.S. Cl. ........................................ 713/300; 714/24
(58) Field of Search ................................ 713/320, 300; 714/24

(56) References Cited

U.S. PATENT DOCUMENTS 5,247,205 A * 9/1993 Mototani et al. .............. 307/66
6,255,744 B1 * 7/2001 Shih et al. ..................... 307/66
6,314,528 B1 * 11/2001 Kim ............................. 714/24

FOREIGN PATENT DOCUMENTS

| JP | 57195395 A | * 12/1982 | ........... G11C/29/00 |
| JP | 02189694 A | * 7/1990 | ........... G06F/15/78 |
| JP | 06051858 A | * 2/1994 | ............. G06F/1/00 |

* cited by examiner

Primary Examiner—Lynne H. Browne
Assistant Examiner—Eric Chang
(74) Attorney, Agent, or Firm—Fitzpatrick, Cella, Harper & Scinto

(57) ABSTRACT

The life of a secondary battery is extended and important data is backed up when power trouble, such as an incidental power failure, occurs. When a sudden power failure occurs, a battery supplies backup power to a memory for storing data to be backed up. By using a main switch for turning the main power supply of the apparatus on or off, the supply of the backup power from the battery to the memory is stopped, interlocked with the main switch, when the main switch shuts down the main power supply. This reduces the number charge-discharge cycles of the battery, prevents deterioration of the battery, and prolongs the life of the battery.

6 Claims, 5 Drawing Sheets

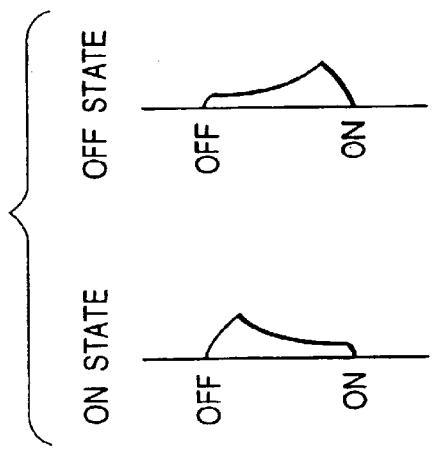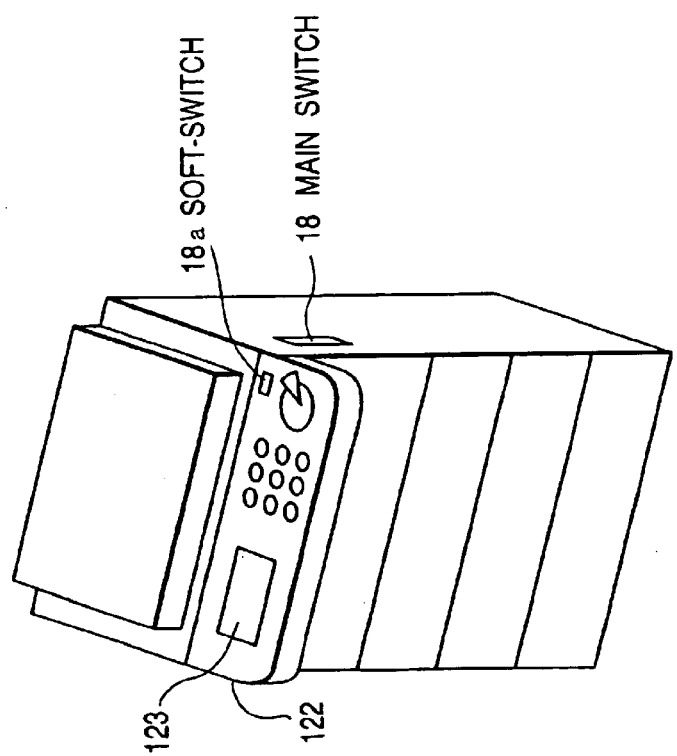

ELECTRONIC APPARATUS

BACKGROUND OF THE INVENTION

1. Field of the Invention

The present invention relates to an electronic apparatus and, more particularly, to an electronic apparatus having a memory for storing data to be backed up when an unexpected power trouble occurs.

2. Related Background Art

Conventionally, techniques of backing up data when a power trouble such as an unexpected power failure occurs have been used in a variety of electronic apparatuses.

For example, in apparatuses such as a facsimile apparatus and a digital composite machine integrating a facsimile function and a printer function, data stored in an image memory is backed up to prevent erasure of received images and data of images reserved for transmission when a power failure occurs. In this type of communication apparatuses, data for controlling and managing communication, e.g., telephone number data and communication recording logs (so-called communication management data such as communication time, required time, and communication results), are also backed up.

As a means for backup, data to be backed up may be stored in a hard disk. However, backing up a memory such as a DRAM by using a secondary battery (an NiCd battery, lead battery, vanadium-based lithium battery, or another chargeable battery) which is more advantageous in cost and installation space, is extensively used.

A similar backup power supply is also used to drive a real-time clock. This configuration can also be considered to back up count data of the real-time clock and hence can be regarded as a backup system.

In a system using a secondary battery described above for memory backup, deterioration of this secondary battery is a serious problem.

Generally, deterioration of chargeable batteries used as secondary batteries of this sort accelerates at high temperatures and further accelerates when a cycle of charging and complete discharging is repeated.

When the life of a secondary battery has expired, the purpose of memory backup cannot be achieved, and a user may lose important data.

In many conventional apparatuses, during a period in which the main power supply is OFF, a secondary battery backs up a memory such as a DRAM. While the main power supply is ON, this secondary battery is charged by a charging circuit.

Since the memory size of an image memory of a facsimile apparatus or a digital composite machine is large, the memory can usually be backed up for about five hours at most when charging and backup are performed as described above (when no charging is performed in a period during which the main power supply is OFF).

When the main power supply of an apparatus is turned off every night (or when an apparatus is used in a similar way, e.g., when the main power supply of an apparatus is turned off for a predetermined period of time on the basis of timer counting), deterioration of a secondary battery may make the conventional system as described above unable to achieve its original function of backing up data if power is shut down by a sudden power failure or the like.

To prevent this, it has been considered to monitor the voltage level of a battery constituting a secondary battery, estimate the degree of deterioration from a voltage drop, and, if necessary, allows a user or a serviceman to replace the battery itself with a new one.

Even if such a countermeasure is used, however, a battery deteriorates very rapidly when a charge-complete discharge cycle is repeated. In effect, when the power supply is turned off every night, the battery must be frequently replaced. Therefore, this countermeasure is not a realistic solution.

In this sense, to prevent deterioration of a secondary battery, it is important to reduce the number of repetition times of a charge-complete discharge cycle.

Depending on the type of data, it is necessary to reconsider whether the data is to be backed up by using a resource, i.e., a secondary battery, having the problem of deterioration as described above. For example, data such as telephone number data and communication logs of a facsimile apparatus or a composite digital machine must be backed up because the user should be in trouble if they are lost. However, image data received in a memory but still unrecorded can be forcedly output if power shutdown is unavoidable. This obviates the need for backup using a secondary battery.

Thus, there is thought of such a structure that which in linkage with a main switch for controlling turn-on/turn-off of a main power supply of an apparatus, supplying of a power from a backup battery to a memory (that is, discharge of the backup battery) to thereby reduce the number of cycles of charge/discharge of the backup battery.

Alternatively, there may be a case where such a structure is more practical that the premise that data stored in a memory is always important and it must be backed up at all times is withdrawn, and as the need arises, a user can shut down a main power supply of an apparatus or a backup power supplying system.

The present invention aims at removal of the above-mentioned troubles to thereby protect important data stored in a memory and practically control the supply of an electric power in an apparatus equipped with a main power supply or a backup power supplying system.

SUMMARY OF THE INVENTION

The present invention has been made in consideration of the above situation, and has as its object to extend the life of a secondary battery as long as possible, and reliably back up important data when a power trouble such as an accidental power failure occurs.

BRIEF DESCRIPTION OF THE DRAWINGS

FIG. 3A is a view showing the external appearance of the electronic apparatus according to the present invention;

FIG. 3B is a side view showing a main switch;

DESCRIPTION OF THE PREFERRED EMBODIMENT

An embodiment of the present invention will be described below with reference to the accompanying drawings.

In this embodiment, the function of a backup power supply, i.e., reliably backing up important data when a power trouble such as an unexpected power failure occurs, is regarded as most important. To achieve this function, the embodiment 1) reduces the number of repetition times of a cycle of charging and completely discharging a battery constituting a secondary battery, and
2) distinguishes between an accidental power trouble and a normal main power supply shutdown, and stops discharging of the battery constituting the secondary battery in main power supply shutdown which is routinely performed.

Figure 1:
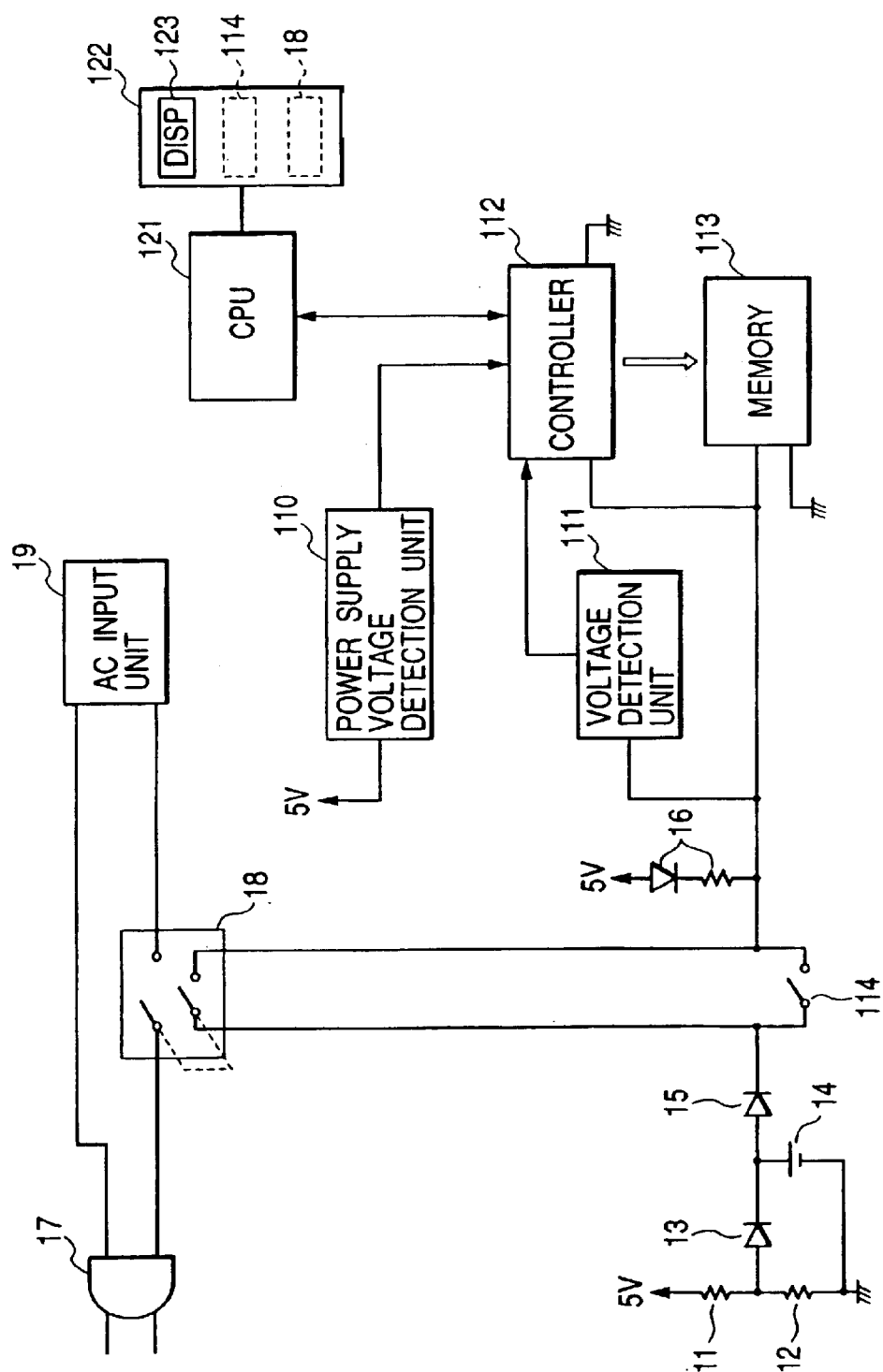
FIG. 1 is a block diagram showing the arrangement of the major parts of an electronic apparatus according to the present invention.

FIG. 1 shows the arrangement of the major components of an electronic apparatus using the technical concept as described above.

Referring to FIG. 1, a battery 14 constitutes a secondary battery. The electronic apparatus of this embodiment is a facsimile apparatus or a digital composite machine. Therefore, the battery 14 is used to back up image data stored in an image memory (not shown), e.g., received image data or input image data from a scanner or the like, when a power trouble such as an unexpected power failure occurs. Backing up such an image memory requires a large current, so a vanadium-based lithium battery or the like is used as this battery 14.

Resistors 11 and 12 divide the power supply voltage of a 5-V power supply of this apparatus. This divided voltage charges the battery 14. A diode 13 prevents a reverse current.

A diode 15 also prevents a reverse current. Backup power is supplied to a memory 113 via this diode 15. A switch 114 is inserted between the diode 15 and the memory 113. The function of this switch 114 will be described later.

The memory 113 includes an inexpensive DRAM advantageous in memory capacity and cost. A DRAM controller 112 controls this DRAM of the memory 113. Peripheral configurations of the controller 112 and the memory 113 will be described in detail later.

A main switch 18 of this apparatus incorporates contacts of two circuits as shown in FIG. 1. One of the two circuits of this main switch 18 controls supply of input commercial AC power from an AC plug 17 to an AC input unit 19.

In this embodiment, the main switch 18 is a mechanical switch. However, the main switch 18 may also be an analog switch or the like.

The AC input unit 19 controls power supply to a main power supply circuit (not shown). That is, this AC input unit 19 turns on/off the power supply of the whole system in accordance with connection/disconnection of the hot side by the main switch 18. In this embodiment, the AC input unit 19 includes a filter as a countermeasure against line noise, an electric leakage breaker as a safety circuit, and a door switch as a safety circuit for jam recovery of a copying machine.

The output stage of the AC input unit 19 includes the above-mentioned 5-V power supply, switching power supplies for supplying various power supply voltages, a fixing heater necessary for an electrophotographic copying machine, and the like. However, these parts have no immediate connection with the present invention, so none of them are shown in FIG. 1. Also, components required to actually constitute a digital copying machine are not novel techniques. Hence, these components are also not shown in FIG. 1, and a detailed description thereof will be omitted.

Details of control of the memory and the battery constituting the secondary batter as the core of the present invention will be described below.

Blocks indicated by reference numerals 110 and 111 are placed around the memory 113 and the controller 112.

A power supply voltage detection unit 110 detects shutdown of the 5-V power supply. That is, this power supply voltage detection unit 110 detects shutdown of the 5-V power supply based on a threshold value of about 4.7 V.

Usually, in a main power supplying state (that is, in a state of feeding a power through the AC input unit), the memory is activated by the main power supply. But, if the power supply is shut down by a sudden power failure or the like, a self-refresh mode starts by which the DRAM of the memory 113 is backed up by a low current by using the battery 14. That is, on the basis of the detection result from the power supply voltage detection unit 110, the controller 112 switches to the self-refresh mode. The controller 112 must, of course, switch to the self-refresh mode before the power supply voltage (5 V) drops below the logic operation guaranteed level, so the threshold voltage is set to about 4.7 V described above.

A voltage detection unit 111 detects deterioration of the battery 14 by detecting its output voltage. In this embodiment, if this voltage detection unit 111 detects that the output voltage from the battery 14 is 2.5 V or less, a CPU 121 for controlling the whole apparatus via the controller 112 determines that the battery 14 has deteriorated, and displays a warning indicating the necessity of replacement of the battery by using a display unit 123 of an operation unit 122.

Note that the voltage detection unit 111 need not always detect the output voltage from the battery 14. In this embodiment, the output voltage is monitored once when the power supply voltage detected by the power supply voltage detection unit 110 is 4.5 V or more after the main power supply is turned on. In accordance with the result of this monitoring, the warning described above is displayed as needed.

The operation unit 122 has an operating means such as a keyboard necessary to operate the apparatus. The main switch 18 and the switch 14 are also arranged on this operation unit 122 if necessary.

A circuit 16 switches the power to be supplied to the memory 113 between the 5-V system, supplied from the main power supply circuit, and the battery 14. This circuit 16 includes a diode and resistor. If the supply of 5 V from the main power supply is shut down, the backup power is supplied from the battery 14 to the memory 113 via the diode 15 and the main switch 18 (or the switch 114).

In response to shutdown of the main switch 18 to be described later, the discharging of the battery 14 (i.e., the supply of the backup current to the memory 113) is stopped. This operation is inhibited by closing the switch 114.

The operation of the above configuration will be described below. Assume that the switch 14 is open. In this state, the operation of stopping the discharging of the battery 14 is effective in response to the shutdown of the main switch 18 (the state shown in FIG. 1).

When the main switch 18 is closed (i.e., when the two circuits are simultaneously closed), the main power supply of the apparatus is turned on via the AC input unit 19, making each unit of the apparatus operable. The battery 14 is charged via the diode 13, and the controller 112 operates the memory 113 in a normal mode (if the output from the 5-V system exceeds the threshold value of the power supply voltage detection unit 110).

In this state, if the main power supply output lowers owing to a sudden power failure or the like although the main switch 18 is closed, the power supply voltage detection unit 110 detects this lowering of the output from the 5-V system as described above. As a consequence, the self-refresh mode starts under the control of the controller 112 to back up the contents of the memory 113 by a low current by using the battery 14. In this state, the backup power is supplied from the battery 14 to the memory 113 via the diode 15 and the main switch 18.

On the other hand, when a user manually shuts down the main switch 18 at night or for some other reason, the lower circuit of the main switch 18 shown in FIG. 1 is opened (the upper circuit is opened at the same time). This disconnects the battery 14 from the power supply path of the backup system (if the switch 114 is also open), stopping discharging the battery 14 (the supply of power to the memory 113).

Accordingly, it is possible to reduce the number of times of the charge-discharge cycle of the battery 14 and prevent deterioration of the battery 14.

Naturally, image data and the like stored in the memory 13 are not backed up. However, image data and the like received in the memory but still unrecorded can be output by using a forced recording output function commonly installed in an apparatus of this type, before the AC input unit 19 completely shuts down the main power supply.

A memory storing therein telephone number data, communication management data and some other important data can be constituted by another nonvolatile memory different from the memory 113 or can be separately backed up by a backup power supply of another system (not shown).

In this way, it is possible to reduce the number of times of the charge-discharge cycle of the battery 14, prevent deterioration of the battery 14, and prolong the life of the battery 14. Therefore, the battery 14 can reliably achieve its original backup function when a power trouble such as a power failure or short break occurs.

Furthermore, it is possible to compose the main switch 18 by a mechanical switch and physically disconnect the power supply line of the battery 14 by mechanical interlocking with shutdown of the main power supply, thereby stopping the discharging of the battery, i.e., the supply of the backup power. When this is the case, the effect of preventing deterioration of the battery 14 can be simply and inexpensively obtained.

Also, the switch 114 shorts that portion of the backup power supply line, which is shut down by the main switch 18. This allows a user to choose whether to perform the operation of stopping the supply of the backup power from the battery 14, interlocked with the main switch 18, in accordance with the demand.

For example, a user who does not basically turn off the main power supply selects a mode in which the switch 114 is shorted. In this case, the contents of the memory 113 can be protected if the main switch is accidentally turned off. On the other hand, a user who wants to turn off the main power supply every night because of having no use of a FAX function at midnight can use a mode in which the switch 114 is open to protect information only when a power trouble such as a power failure or short break occurs. The switch 114 can have various names, such as "backup battery protection mode switch" and "memory backup priority mode switch", in accordance with which function of the switch 114 is regarded as important.

Note that the above configuration is based on the assumption that the battery 14 is only for an unexpected power trouble, and data not so important need not be backed up when the main switch 18 is turned off. However, this does not mean that data backup is completely stopped.

[Second Embodiment]

The first embodiment shows a basic configuration of the present invention. In the present invention, the battery 14 is only for an unexpected power trouble, and data not so important need not be backed up when the main switch 18 is turned off. However, this does not mean that data backup is completely stopped.

As the second embodiment, there will be depicted hereinbelow a configuration for executing such a control to inhibit to turn off the power supply for backup in linkage with an operation for turn-off of the main switch by the main switch, to inhibit to turn off the main switch and to warn a user that important data is being erased.

For example, in a facsimile apparatus, image data received in the memory but still unrecorded can be forcibly output as described earlier. If, however, this recording is impossible because of exhaustion of recording sheets, i.e., if the operation for data protection cannot be performed, it is necessary to inhibit shutdown of the main power supply by the main switch 18 and inhibit the interlocked stoppage of backup, or at least warn a user of this. Also, if information for reservation of transmission remains and must be transmitted at a determined time by timer transmission or the like, shutdown of the main power supply must be prohibited.

That is, there may be realized such a structure that the CPU 121 detects whether data (unrecorded received data, and control data and image data for timer transmission) which causes serious damage when erased exists in the memory 113, i.e., whether conditions by which shutdown of the main power supply and the interlocked stoppage of backup cannot be performed are present, and that in accordance with the detection result, shutdown of the main power supply by the main switch 18 is inhibited or a warning is issued to a user.

Figure 2:
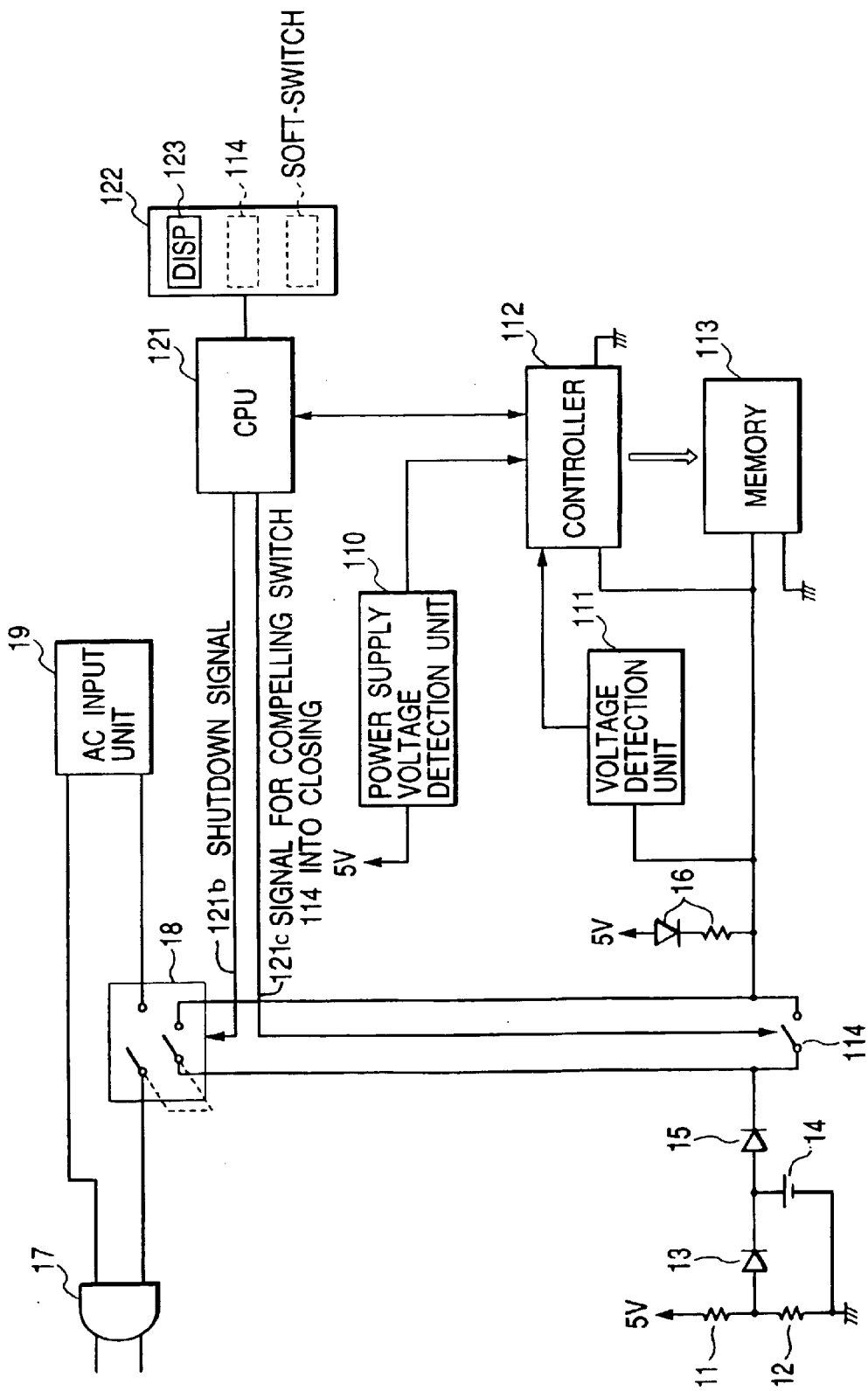
FIG. 2 is a block diagram showing the arrangement of the main components of the electronic apparatus according to the present invention.

FIG. 2 shows a circuitry of the present embodiment and FIG. 3 shows an outside appearance of a facsimile machine (or a digital composite machine) as an example of an apparatus in which the circuitry as shown in FIG. 2 is used.

In the present invention, two circuits of the main switch 18 are structured by a switch having a shutdown function (or analog switches). This switch is not provided on an operation unit 122, but on a side of an apparatus as shown in FIG. 3.

The switch having a shutdown function, which constitutes the main switch 18, provides an outside appearance of a seesaw switch as shown in an enlarged view at a right side on FIG. 3. While this switch is a switch for mechanically turning on/off the main power supply, it has a signal line for forcibly shutting down the power supply and upon reception of a shutdown signal (121b in FIG. 2), a switch mechanism is controlled by an internal driver means (such as a solenoid) to shut down the circuit.

That is, when the switch having the shutdown function, which constitutes the main switch 18, receives the shutdown signal, a mechanic contact thereof is opened. For again turning on the power supply, it is required for a user to push down the switch to thereby close the mechanic contact.

This switch is used in such a machine as a facsimile machine having a function of turning off a power supply automatically at night. It is also employed frequently when there is required a function of shutting down the switch responsive to a shutdown signal outputted by the CPU at a predetermined time.

In the present embodiment, as shown in FIGS. 2 and 3, a soft-switch 18a by which a user inputs an instruction to turn off the power supply is added to the operation unit 122 (the main switch 18 is not provided on the operating unit 122).

The switch 114 is composed of analog switches and others, and its closed state is held by a signal 121c from the CPU. That is, in the present embodiment, the switch 114 is used as a switch means for forcibly keeping the supply of power from the battery 14 to the memory 113.

Figure 4:
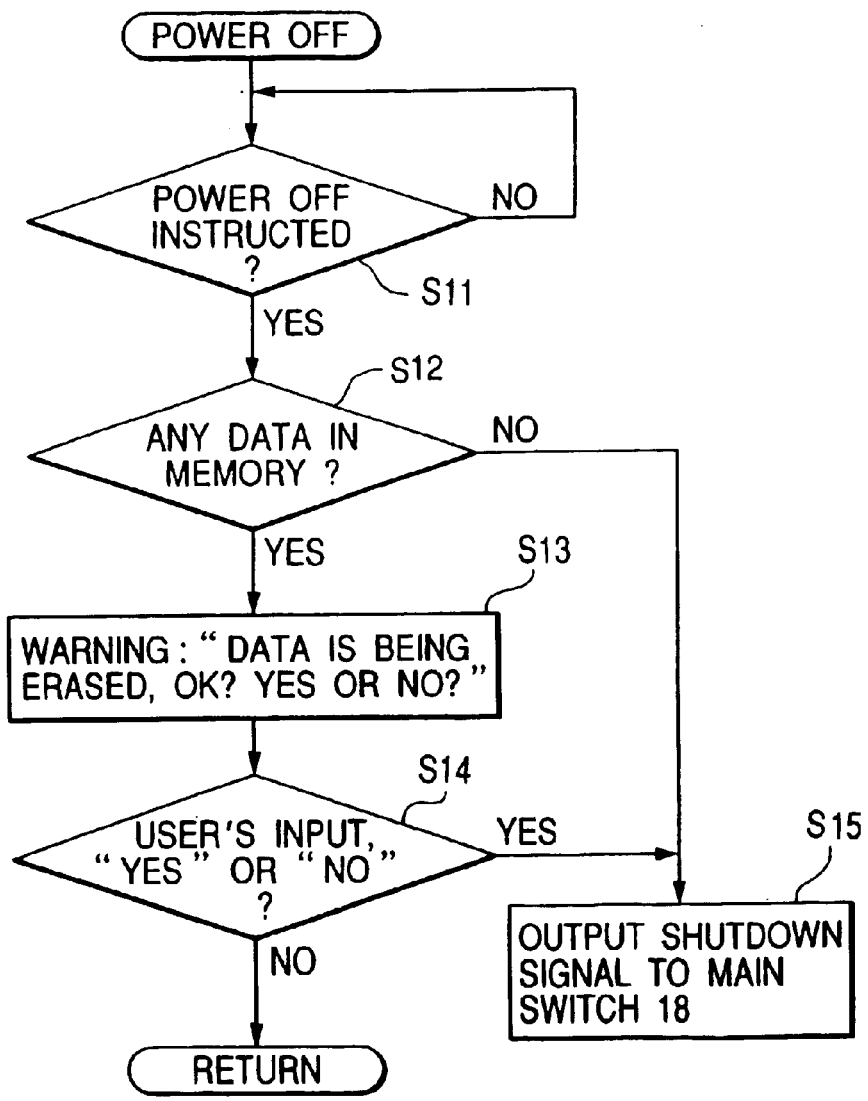
FIG. 4 is a flow chart of control by a CPU 121 of the present invention.
Figure 5:
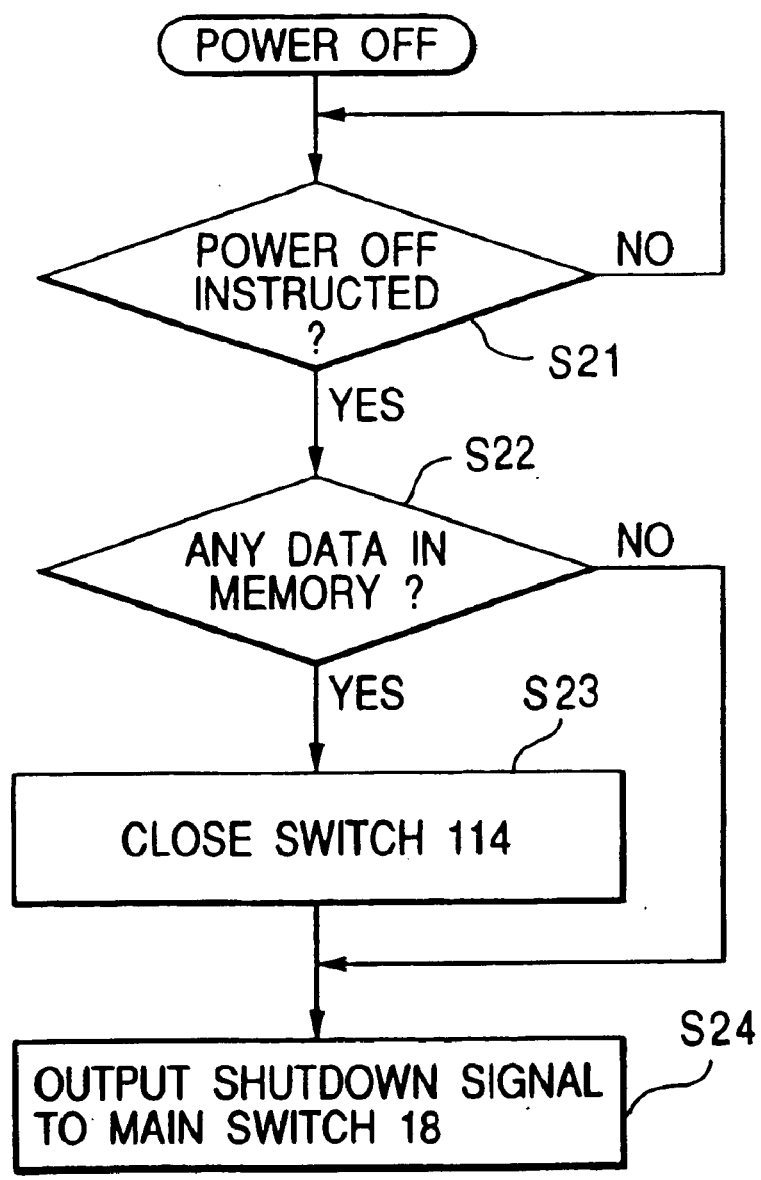
FIG. 5 is a flow chart of control by the CPU 121 of the present invention.

In using the main switch 18 and the soft-switch 18a as above-mentioned, the CPU 121 executes control processes as shown in FIGS. 4 and 5. Control procedures of FIGS. 4 and 5 are stored in advance as a control program in a ROM 121a.

First, control steps as shown in FIG. 4 will be described.

To turn off the power supply, an user inputs an instruction to turn off the power supply by the soft-switch 18a. When power OFF is instructed by the soft-switch 18a (step S11), the CPU 121 determines whether important data which causes serious damage when erased by stoppage of the backup power supply to the memory 113 is stored in the memory 113, i.e., whether conditions by which shutdown of the main power supply and the interlocked stoppage of backup cannot be performed are present (step S12). This determination is realized by examining various flags and control parameters stored in a control memory (not shown) used for controlling an operation of the apparatus.

If the conditions are detected, the CPU 121 may prohibit shutdown of the two circuits of the main switch 18 (a shutdown signal is not outputted) to end the process. But, it is preferable to conduct a control process shown in steps S13 to S15.

That is, both a warning indicating that the important data stored in the memory 113 is being erased and a sign or message for prompting a user to respond to the warning are displayed on a display unit 123 on the operation unit 122 (step S13). Then, the user's response is checked (step S14). The user executes an appropriate key operation on the operation unit 122 to make a response YES or NO.

If the user's response is YES, i.e., the shutdown of the main switch 18 is permissible, a control process advances to step S15 in which the two circuits of the main switch 18 are shut down. If the user's response is No, i.e., the shutdown of the main switch 18 should be stopped, no more operation is executed for the power OFF control.

In the step S12 of FIG. 4, there is permitted another process that a state of the switch 114 composed of analog switches is checked, and only when the switch 114 is in an open state, the control process advances to the step S13, while when closed, it directly advances to the step S15 because the important data is free from being damaged.

Alteratively, as shown in FIG. 5, there is permitted such a process that if important data is present in the memory 113 when the power OFF is instructed through the soft-switch 18a, the switch 114 composed of analog switches is forcibly closed so as to prevent the important data from being damaged.

In this case, when the power OFF is instructed by the soft-switch 18a (step S21), the CPU determines whether important data is stored in the memory 113 (step S22). If conditions by which shutdown of the main power supply and the interlocked stoppage of backup cannot be performed are detected, the switch 114 composed of the analog switches is forcibly closed by the signal 121c (step S23) so as to cause the battery 14 to backup the memory 113. If no important data is present in the memory 113, the main switch 18 is shut down (step 524).

With the above-mentioned configuration of the present embodiment, there can be securely protected important data which causes serious damage when erased (the before-mentioned received data as not recorded yet, and control data and image data for timer transmission).

In particular, according to the control as shown in FIG. 4, if important data is present in the memory 113 when shutdown of the main power is instructed through the soft-switch 1a, a user can receive a warning, so that he/she can dare to shut down the main power as the occasion demands or he/she can withdraw the instruction if the stored data is important.

According to the control in FIG. 5, if important data is stored in the memory 113 when the shutdown of the main power is instructed through the soft-switch 18a, a user can forcibly hold the power supply from the backup battery by using the switch 114, thereby preventing the important data stored in the memory from being lost.

The embodiment has been described by taking a backup power supply system of a facsimile apparatus or a digital composite machine as an example. However, the present invention is, of course, applicable to electronic apparatuses (e.g., diverse computer systems such as desktop and notebook computer systems and wordprocessors) having similar backup power systems.

As has been described above, the present invention provides an electronic apparatus which comprises a memory to which a power is supplied from a main power supply of the apparatus, a main switch for controlling the turn-on/turn-off of the main power supply of the apparatus and a soft-switch for controlling mechanical closing/opening of the main switch. This apparatus further comprises a control means for determining whether data which causes serious damage when erased is stored in the memory, when shutdown of the main power is instructed by the soft-switch, and for controlling a main power supply shutdown operation by the main switch according to a result of the determination. Accordingly, the present invention can execute the following controls. For example, if important data is stored in the memory, the mechanical opening of the main switch is inhibited or a warning indicating important data is being erased is issued to a user. Alternatively, there are provided a backup battery for supplyong the power to the memory during the shutdown of the main power supply and a switch means for controlling supply of the power to the memory, and if important data is stored in the memory, the switch means forcibly holds the supply of the power from the backup battery to the memory. Whereby, the present invention can provide excellent advantage that important data stored in the memory is securely held and the power supply of the apparatus including the main power supply and/or a backup power supplying system is practically controlled.

What is claimed is:

1. An electronic apparatus including a memory to which a power is supplied from a main power supply of the apparatus, a main switch for controlling turn-on/turn-off of the main power supply of the apparatus and a soft-switch for controlling mechanical closing/opening of the main switch, said apparatus further comprising:

control means for determining whether important data which causes serious damage when erased is stored in the memory, when the shutdown of the main power supply is instructed by the soft-switch, and for controlling a shutdown operation of the main power supply by the main switch according to a result of the determination;

backup battery for supplying power to the memory while the main power supply is shut down;

switch means controlling the supply from the backup battery to the memory;

wherein said control means causes the switch means to forcibly hold the supply of power from the backup battery to the memory when the control means determines that important data is stored in the memory, while said control means causes the switch means not to supply the power from the backup battery to the memory when the control means determines that no important data is stored in the memory.

2. An apparatus according to claim 1, wherein said control means inhibits the mechanical opening of the main switch when it is determined that important data is stored in the memory.

3. An apparatus according to claim 1, wherein said control means warns a user that important data is being erased, when it is determined that the important data is stored in the memory.

4. A method for use with an electronic apparatus having memory, power is supplied to the apparatus from a main power supply of the apparatus, a main switch controls the main power supply, and a soft-switch controls a mechanical closing and opening of the main switch, the method comprising:

determining whether important data which causes serious damage when erased is stored in the memory of the apparatus, when the shutdown of the main power supply is instructed by the soft-switch;

controlling a shutdown operation of the main power supply by the main switch when it is determined that important data is stored in the memory; and controlling the switch control means to forcibly hold supply of power from a backup power supply to the memory when it is determined that important data is stored in the memory, and controlling the switch means not to supply power from the backup battery to the memory when it is determined that no important data is stored in the memory.

5. A method according to claim 4, further comprising:

inhibiting the mechanical opening of the main switch when it is determined that important data is stored in the memory.

6. A method according to claim 4, further comprising:

warning a user that important data is being erased, when it is determined that the important data is stored in the memory.

* * * * *